United States Patent
Akkarakaran et al.

(10) Patent No.: US 10,917,907 B2
(45) Date of Patent: Feb. 9, 2021

(54) RESOURCE ALLOCATION FOR RANDOM ACCESS PROCEDURE MESSAGES

(71) Applicant: QUALCOMM Incorporated, San Diego, CA (US)

(72) Inventors: Sony Akkarakaran, Poway, CA (US); Peter Gaal, San Diego, CA (US); Tao Luo, San Diego, CA (US); Yi Huang, San Diego, CA (US); Renqiu Wang, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/181,942

(22) Filed: Nov. 6, 2018

(65) Prior Publication Data

US 2019/0141735 A1    May 9, 2019

Related U.S. Application Data

(60) Provisional application No. 62/584,087, filed on Nov. 9, 2017.

(51) Int. Cl.
*H04W 4/00* (2018.01)
*H04W 72/12* (2009.01)
(Continued)

(52) U.S. Cl.
CPC .......... *H04W 72/1289* (2013.01); *H04L 1/18* (2013.01); *H04L 5/0055* (2013.01); *H04W 74/0833* (2013.01); *H04W 72/14* (2013.01)

(58) Field of Classification Search
None
See application file for complete search history.

(56) References Cited

U.S. PATENT DOCUMENTS

| 2013/0157669 | A1* | 6/2013 | Turtinen | H04W 48/12 455/450 |
| 2015/0264718 | A1* | 9/2015 | Yu | H04W 72/02 370/329 |
| 2016/0192388 | A1* | 6/2016 | Ekpenyong | H04L 1/1829 370/329 |

FOREIGN PATENT DOCUMENTS

WO   2017039374 A1   3/2017

OTHER PUBLICATIONS

Intel Corporation: "Resource allocation for PUCCH", 3GPP Draft; R1-1717389 Resource allocation for PUCCH, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017, XP051340579, Retrieved from the Internet; URL: http://www.3gpp. org/ftp/Meetings_3GPP_SYNC/RAN1/Docs/ [retrieved on Oct. 8, 2017], 6 pages.

(Continued)

*Primary Examiner* — Zewdu A Beyen
(74) *Attorney, Agent, or Firm* — Qualcomm Incorporated

(57) ABSTRACT

Various aspects of the present disclosure generally relate to wireless communication. In some aspects, a user equipment may determine information that identifies a resource for transmitting an acknowledgment of a message associated with a random access procedure. The information that identifies the resource may be determined based at least in part on at least one of: a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure. In some aspects, the user equipment may (Continued)

transmit the acknowledgment based at least in part on the information that identifies the resource. Numerous other aspects are provided.

34 Claims, 10 Drawing Sheets

(51) Int. Cl.
   *H04W 74/08* (2009.01)
   *H04L 5/00* (2006.01)
   *H04L 1/18* (2006.01)
   *H04W 72/14* (2009.01)

(56) References Cited

OTHER PUBLICATIONS

International Search Report and Written Opinion—PCT/US2018/059583—ISA/EPO—dated Jan. 28, 2019.
Motorola Mobility et al., "PUCCH Resource Allocation for HARQ-ACK Feedback to Msg4", 3GPP DRAFT; R1-1714221 PUCCH RA for HARQ-ACK Feedback to Msg4, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017 (Aug. 20, 2017), XP051317009, Retrieved from the Internet: URL:http://www.3gpp.org/ftp/Meetings_GPP_SYNC/RAN1/Docs/ [retrieved on Aug. 20, 2017], 4 pages.
OPPO: "Summary of Offline Discussions for PUCCH Resource Allocation until Oct. 13th", 3GPP DRAFT; R1-1719168 Summary of Offline Discussions for PUCCH Resource Allocation until Oct. 13th, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 17, 2017 (Oct. 17, 2017), XP051353636, Retrieved from the Internet: URL:http://www.3gpp.org/ftp/tsg_ran/WG1_RL1/TSGR1_90b/Docs/ [retrieved on Oct. 17, 2017], 9 pages.
Samsung: "Resource Allocation for PUCCH transmission", 3GPP Draft; R1-1717655_PUCCH Resource, 3rd Generation Partnership Project (3GPP), Mobile Competence Centre; 605, Route Des Lucioles; F-06921 Sophia-Antipolis Cedex; France, vol. RAN WG1, No. Prague, CZ; Oct. 9, 2017-Oct. 13, 2017, Oct. 8, 2017 (Oct. 8, 2017), XP051340840, Retrieved from the Internet: URL:http://www.3gpp.org/ftp/Meetings_3GPP_SYNC/RAN1/Docs/ [retrieved on Oct. 8, 2017], 4 pages.

* cited by examiner

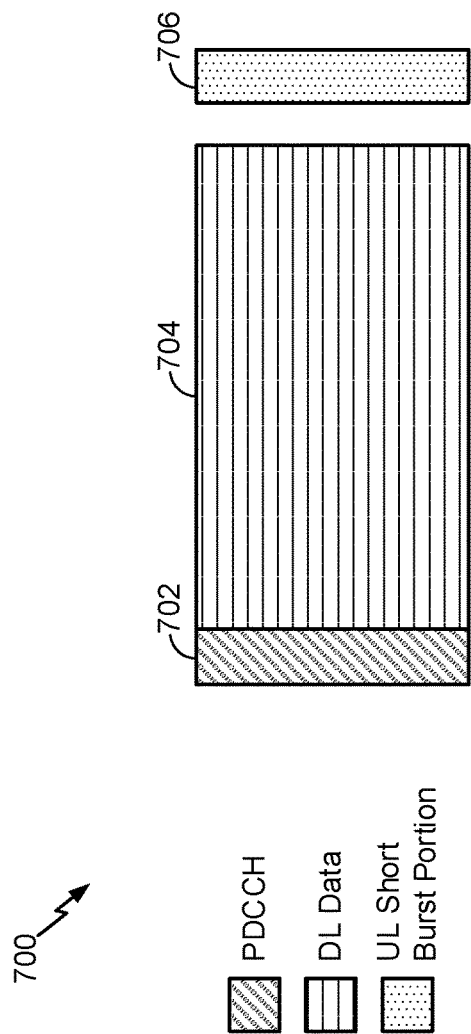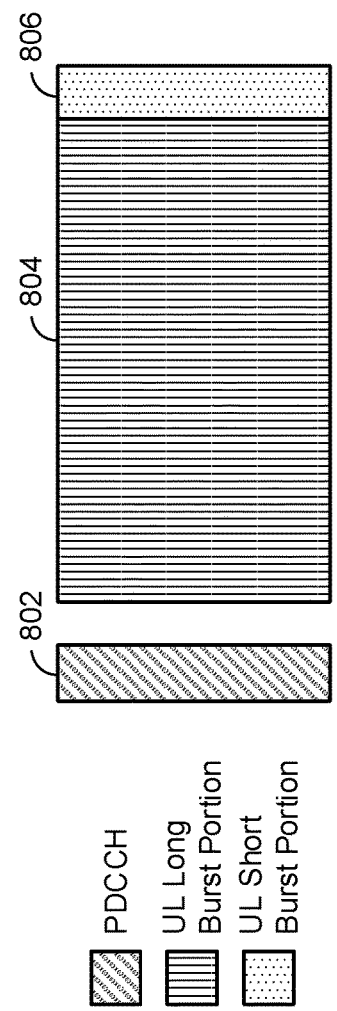

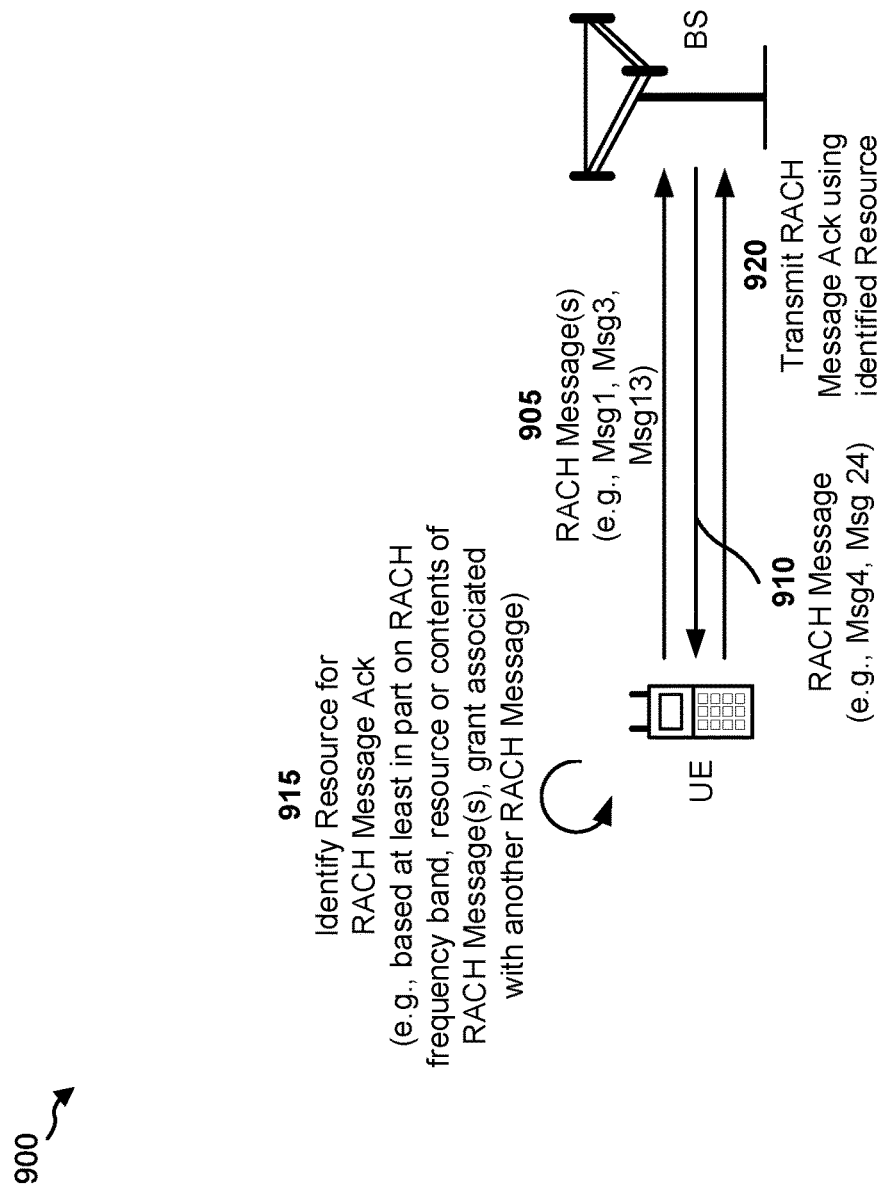

RESOURCE ALLOCATION FOR RANDOM ACCESS PROCEDURE MESSAGES

CROSS-REFERENCE TO RELATED APPLICATIONS UNDER 35 U.S.C. § 119

This application claims priority to Provisional Patent Application No. 62/584,087, filed on Nov. 9, 2017, entitled "TECHNIQUES AND APPARATUSES FOR RESOURCE ALLOCATION FOR RANDOM ACCESS PROCEDURE MESSAGES," which is hereby expressly incorporated by reference herein.

FIELD OF THE DISCLOSURE

Aspects of the present disclosure generally relate to wireless communication, and more particularly to techniques and apparatuses for resource allocation for random access procedure messages.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include determining, by a user equipment, information that identifies a resource for transmitting an acknowledgment of a message associated with a random access procedure, wherein the information that identifies the resource is determined based at least in part on at least one of: a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure; and transmitting, by the user equipment, the acknowledgment based at least in part on the information that identifies the resource.

In some aspects, a user equipment for wireless communication may include a memory and one or more processors configured to determine information that identifies a resource for transmitting an acknowledgment of a message associated with a random access procedure, wherein the information that identifies the resource is determined based at least in part on at least one of: a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure; and transmit the acknowledgment based at least in part on the information that identifies the resource.

In some aspects, a non-transitory computer-readable medium may store one or more instructions for wireless communication. The one or more instructions, when executed by one or more processors of a user equipment, may cause the one or more processors to determine information that identifies a resource for transmitting an acknowledgment of a message associated with a random access procedure, wherein the information that identifies the resource is determined based at least in part on at least one of: a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure; and transmit the acknowledgment based at least in part on the information that identifies the resource.

In some aspects, an apparatus for wireless communication may include means for determining information that identifies a resource for transmitting an acknowledgment of a message associated with a random access procedure, wherein the information that identifies the resource is determined based at least in part on at least one of: a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure; and means for transmitting the acknowledgment based at least in part on the information that identifies the resource.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with various aspects of the present disclosure.

FIG. 8 is a diagram illustrating an example of an uplink (UL)-centric subframe, in accordance with various aspects of the present disclosure.

FIG. 9 is a diagram illustrating an example associated with identifying a resource for transmitting an acknowledgment of a random access procedure message, in accordance with various aspects of the present disclosure.

DETAILED DESCRIPTION

Figure 1:
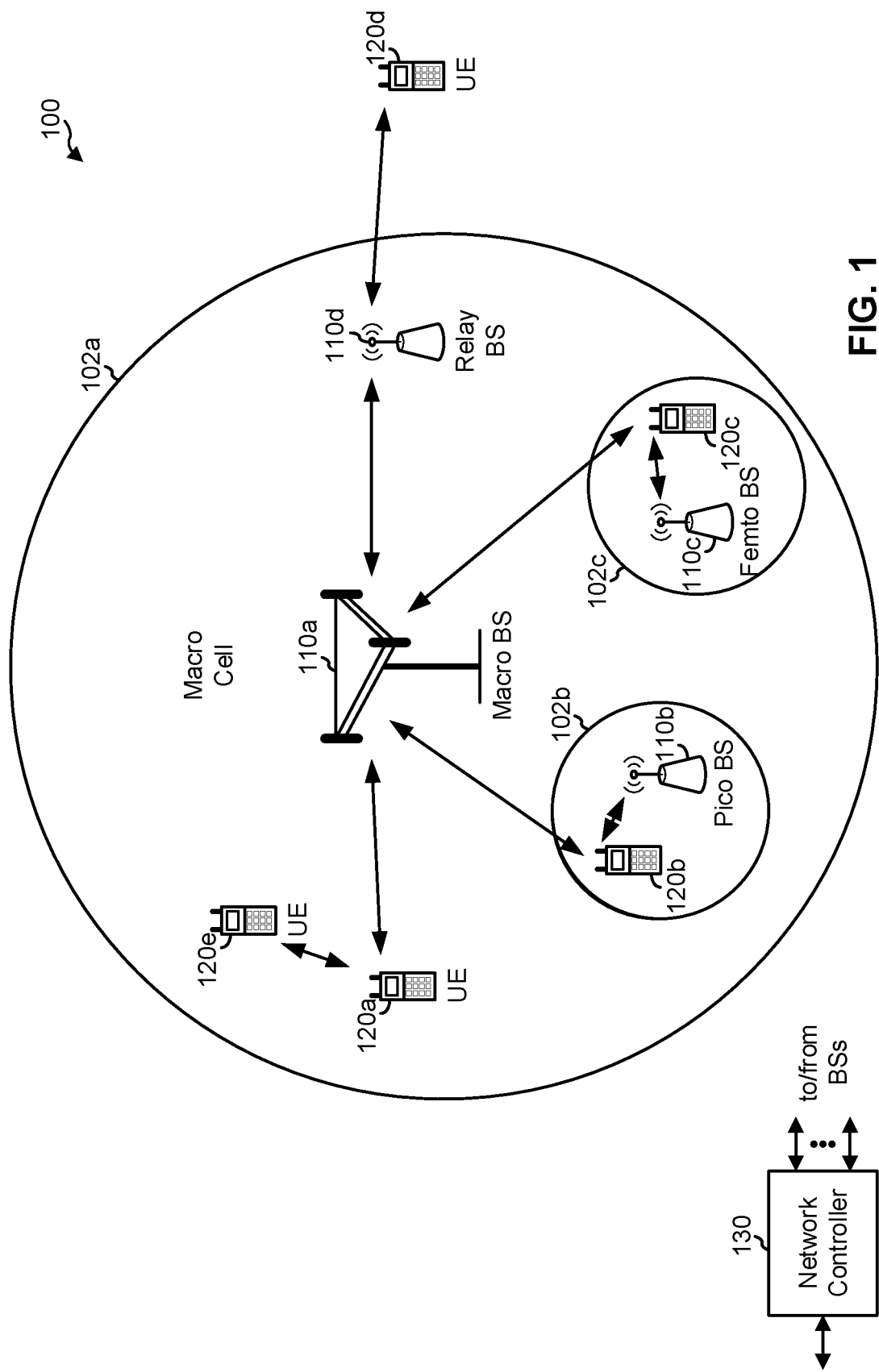
FIG. 1 is a block diagram conceptually illustrating an example of a wireless communication network, in accordance with various aspects of the present disclosure.

A UE may gain access to a wireless network using random access procedure. As part of the random access procedure, the UE may exchange a sequence of messages with a base station. For example, in a four-step random access implemented in an LTE network, the UE transmits a first message (e.g., a random access preamble, Msg1, and/or the like) to the base station, receives a second message (e.g., a random access response, Msg2, and/or the like) from the base station, transmits a third message (e.g., a connection request, Msg3, and/or the like) to the base station, and receives a fourth message (e.g., a contention resolution message, Msg4, and/or the like) from the base station. Upon receiving the fourth message in the sequence of messages, the UE transmits an acknowledgment of the fourth message in a physical uplink control channel (PUCCH) as part of completing the random access procedure and gaining access to the LTE network.

In such a case, the UE identifies a resource in the PUCCH in which to transmit the acknowledgement based on a resource in a physical downlink control channel (PDCCH) in which a DL grant, associated with the fourth message (i.e., the message being acknowledged) is received by the UE, as well as based on broadcast parameters received by the UE in a physical broadcast channel (PBCH) or a system inform block (SIB). In other words, the resource for transmitting the acknowledgement is implicitly identified based in part on the resource that carries the DL grant for the fourth message. In an LTE network, a configuration of the PUCCH is static for each subframe (e.g., the PUCCH starts at the same location relative to a physical downlink shared channel (PDSCH) in each subframe, and has a fixed duration). Thus, the UE is able to reliably identify a PUCCH resource in which to transmit any acknowledgement based on an implicit indication associated with the PDCCH resource that carries the DL grant for the fourth message.

However, in another type of wireless network, such as a NR network, the configuration of the PUCCH may vary among subframes and/or among slots in a subframe. For example, in a NR network, the PUCCH may not always start at the same location relative to the PDSCH, may have a variable duration, and/or the like. In other words, in a NR network, the PUCCH configuration may be dynamically configured among different subframes and/or slots. In such a case, the above described technique does not support identification of the resource for transmission of the acknowledgement (e.g., since the PUCCH may not always begin at the same time relative to the PDSCH). Further, the above described technique may not support identification of a resource for transmission of an acknowledgement when a two-step random access procedure is implemented (e.g., rather than the four-step random access procedure).

Some aspects described herein provide techniques and apparatuses for identifying a resource for transmitting an acknowledgment of a random access procedure message, associated with accessing a wireless network, when a configuration of a PUCCH, associated with transmitting the acknowledgement, may vary among different subframes and/or different slots.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, UE 120 may determine information that identifies a resource for transmitting an acknowledgment of a message associated with a random access procedure, wherein the information that identifies the resource is determined based at least in part on at least one of a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure; and UE 120 may transmit the acknowledgment based at least in part on the information that identifies the resource.

As indicated above, FIG. 1 is provided merely as an example. Other examples are possible and may differ from what was described with regard to FIG. 1.

Figure 2:
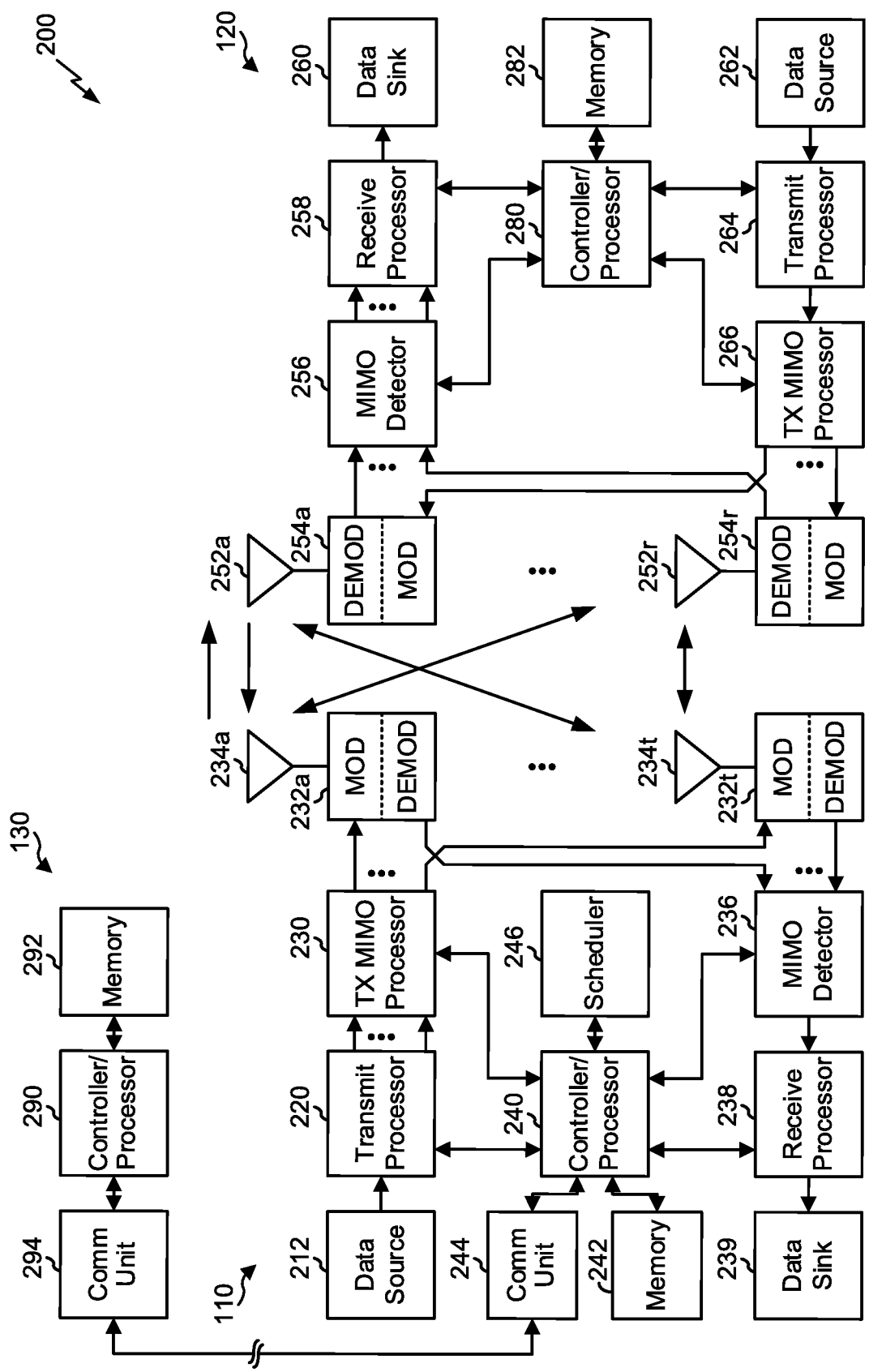
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, an acknowledgement associated with a random access procedure message, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with resource allocation for random access procedure messages, as described in more detail elsewhere herein. For example, controller/processor 280 of UE 120, and/or any other component(s) of FIG. 2 may perform or direct operations of, for example, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining information that identifies a resource for transmitting an acknowledgment of a message associated with a random access procedure, wherein the information that identifies the resource is determined based at least in part on at least one of: a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure; and means for transmitting the acknowledgment based at least in part on the information that identifies the resource, and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples are possible and may differ from what was described with regard to FIG. 2.

Figure 3A:
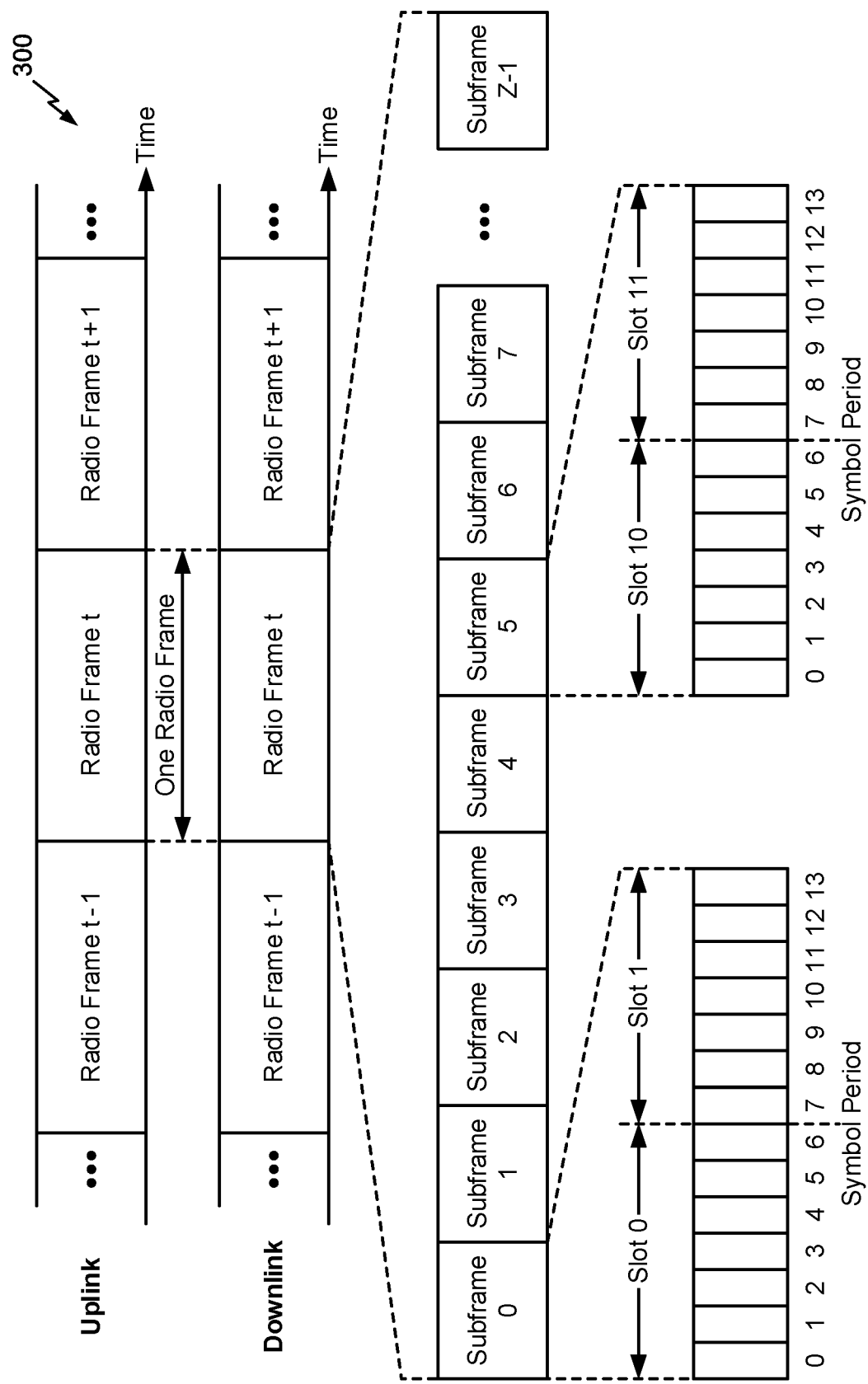
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like. In some aspects, one of more symbol periods, slots, and/or subframes may be used to transmit an acknowledgement associated with a random access procedure message, as described herein.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
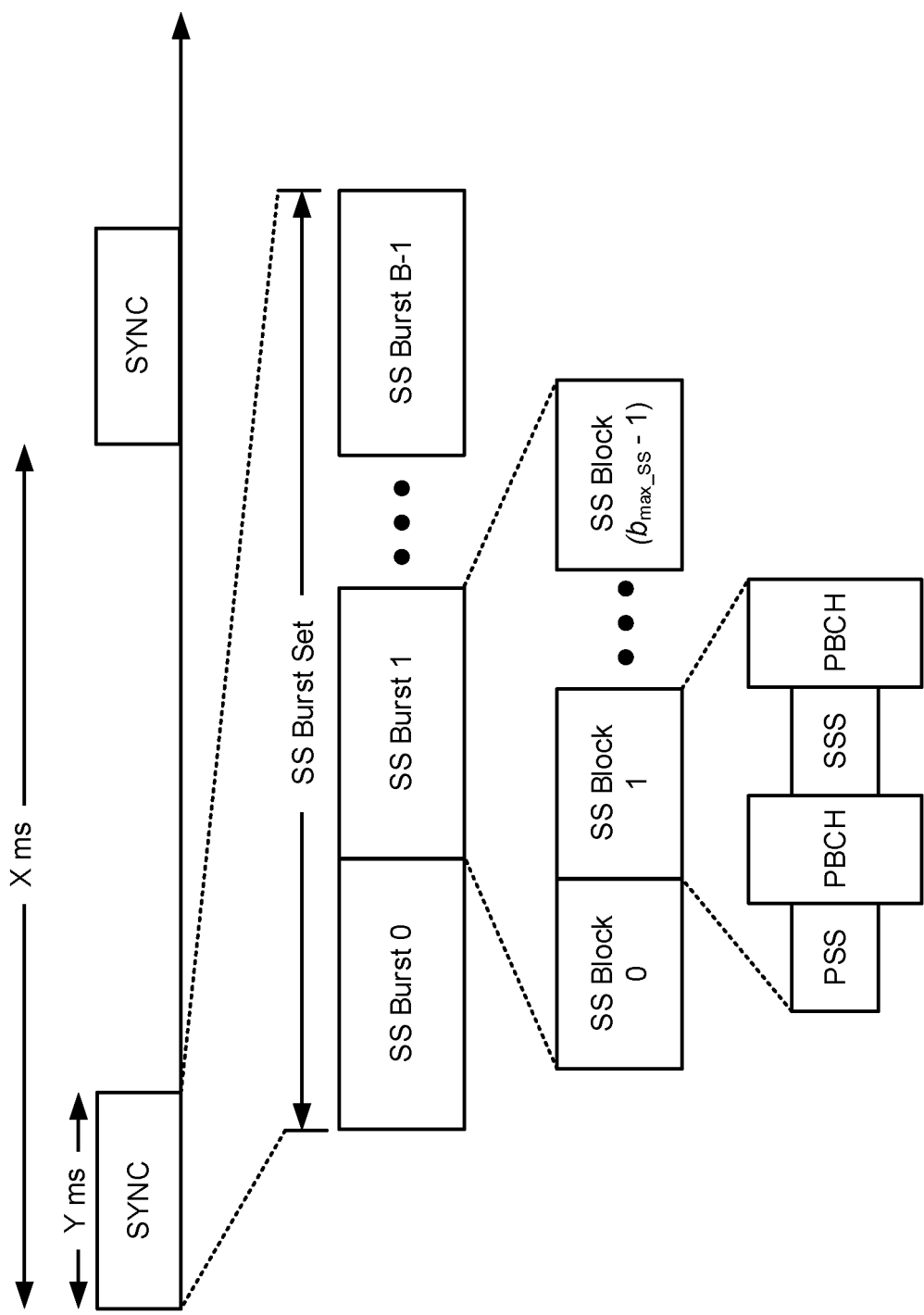
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
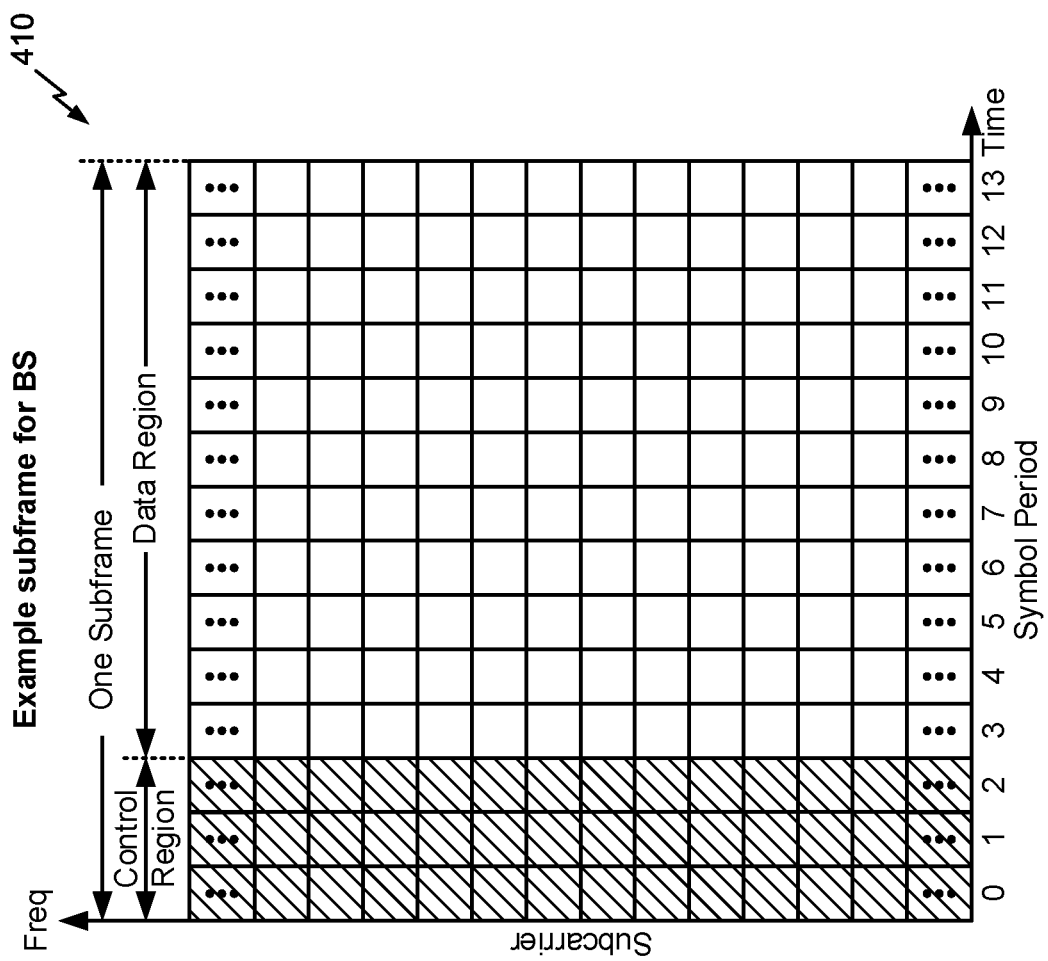
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, an acknowledgement associated with a random access procedure message, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
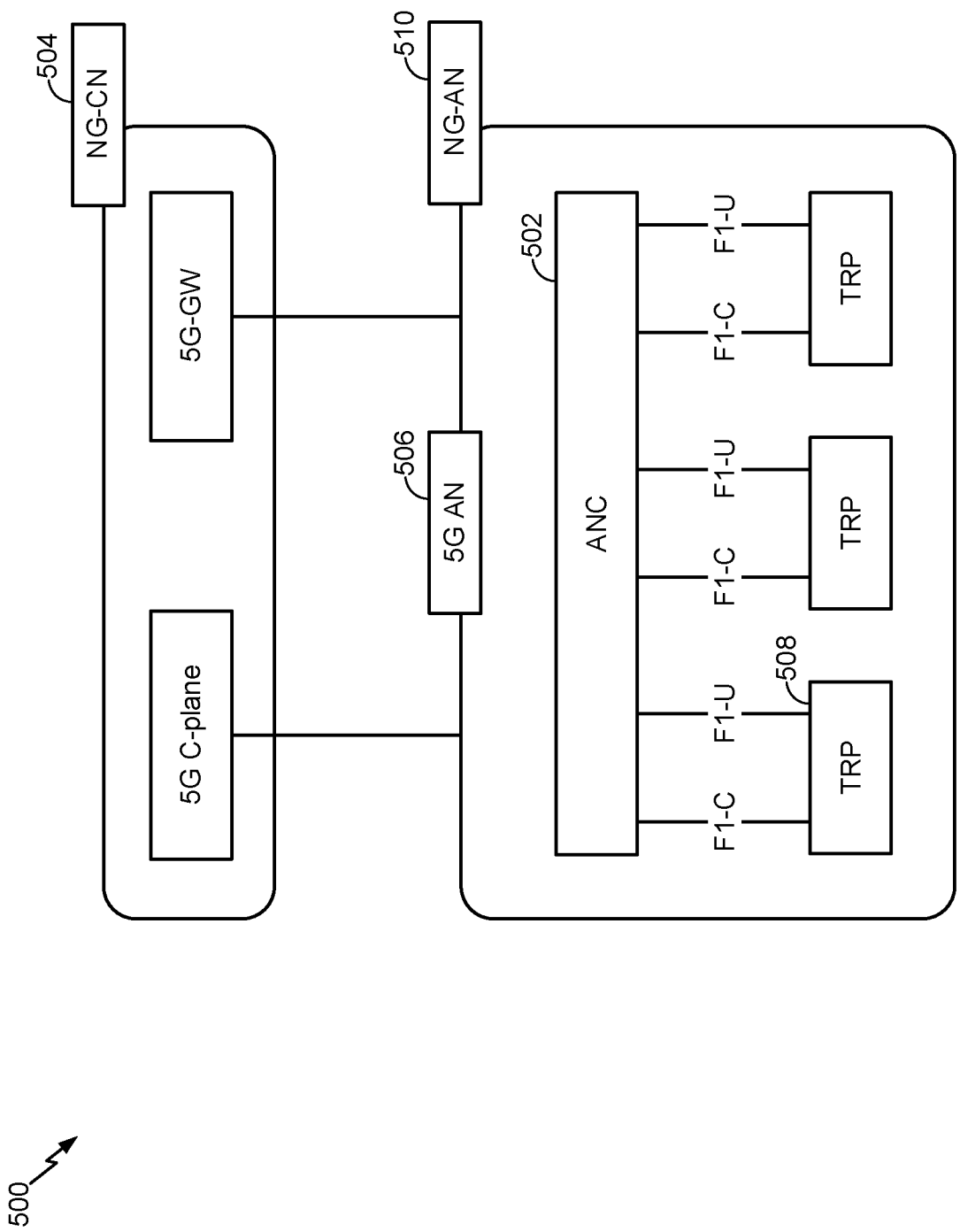
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other device via which a UE may access the 5G network using a random access procedure, as described herein). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
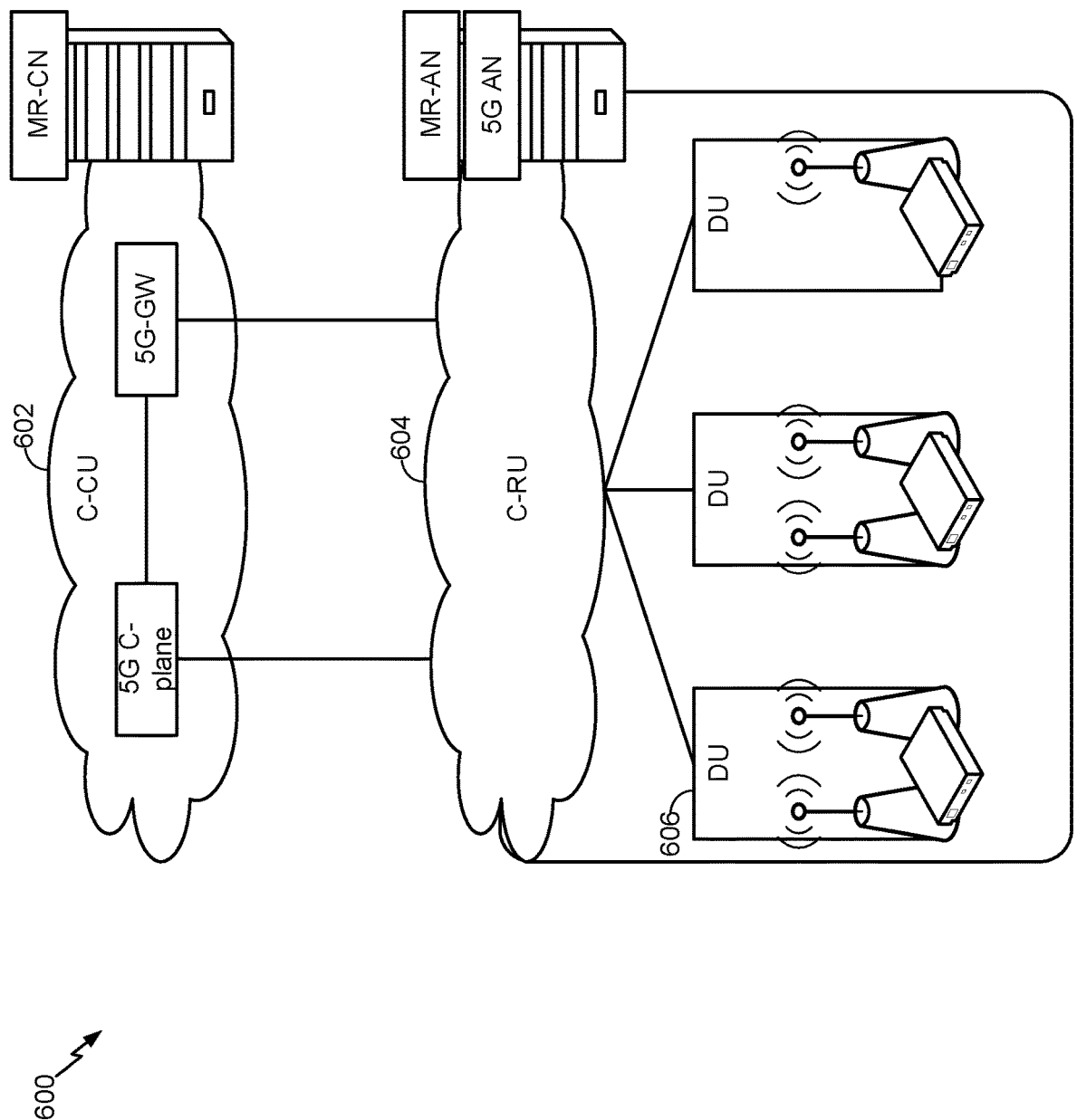
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs (e.g., a device via which a UE may access the 5G network using a random access procedure, as described herein). The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

In some aspects, a UE may transmit a random access procedure message and/or an acknowledgement associated with a random access procedure message in UL short burst portion 706. Similarly, in some aspects, the UE may receive a random access procedure message and/or information associated with a random access procedure message in control portion 702 and/or DL data portion 704.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

In some aspects, a UE may transmit one or more random access procedure messages and/or an acknowledgement associated with a random access procedure message in UL long burst portion 704 and/or UL short burst portion 806. Similarly, in some aspects, the UE may receive one or more random access procedure messages and/or information associated with a random access procedure message in control portion 802.

As indicated above, FIG. 8 is provided merely as an example. Other examples are possible and may differ from what was described with regard to FIG. 8.

FIG. 9 is a diagram illustrating an example 900 associated with identifying a resource for transmitting an acknowledgment of a random access procedure message, associated with accessing a wireless network, when a configuration of a PUCCH, associated with transmitting the acknowledgement, may vary among different subframes and/or different slots, in accordance with various aspects of the present disclosure.

As shown in FIG. 9, and by reference number 905 a UE (e.g., UE 120) may transmit one or more messages, associated with a random access procedure (e.g., Msg1, Msg3, Msg13, and/or the like, identified in FIG. 9 as a RACH messages) to a base station. As shown by reference number 910, the UE may receive a message associated with the random access procedure. Generally, the message includes a message, associated with the random access procedure, for which the UE is to transmit an acknowledgement (e.g., to the base station). For example, in some aspects, the random access procedure may be a four-step random access procedure similar to that described above. In such a case, the message may be a fourth message associated with the four-step random access procedure (e.g., a contention resolution message, Msg4, and/or the like).

As another example, the random access procedure may be a two-step random access procedure. In a two-step random access procedure, the UE may transmit a combined first message to the base station (e.g., a message including a random access preamble and a connection request, Msg13, and/or the like), and may receive a combined second message from the base station (e.g., a message including a random access response and a contention resolution message, Msg24, and/or the like). In such a case, the message to be acknowledged by the UE may be the combined second message associated with the two-step random access procedure.

As shown by reference number 915, the UE may determine information that identifies a resource for transmitting the acknowledgement of the message associated with the random access procedure. In some aspects, the resource for transmitting the acknowledgement may be a PUCCH resource. In some aspects, the acknowledgment is associated with a 1-bit on-off keying technique (e.g., whereby the UE transmits the acknowledgement when appropriate, while other UEs may not transmit acknowledgements upon receiving the message).

In some aspects, the information that identifies the resource for transmitting the acknowledgement may include timing information associated with the resource. The timing information may include, for example, information that identifies a start location of the resource (e.g., a symbol and/or slot in which the resource begins), information that identifies a duration of the resource (e.g., a temporal length of the resource), and/or the like.

Additionally, or alternatively, the information that identifies the resource for transmitting the acknowledgement may include frequency information associated with the resource. The frequency information may include, for example, information that identifies a resource block index associated with the resource (e.g., a value that identifies one or more resource blocks associated with the resource), a number of resource blocks included in the resource, and/or the like. In some aspects, the number of resource blocks may be fixed (i.e., the UE may be configured to transmit each acknowledgement using a fixed number of resource blocks, for example, one resource block).

Additionally, or alternatively, the information that identifies the resource for transmitting the acknowledgement may include code information associated with the resource. The code information may include, for example, a sequence index associated with the resource (e.g., a value that identifies a sequence associated with the resource), a cyclic shift index (e.g., a value that identifies a cycle shift associated with the resource), an orthogonal cover code (OCC) index, and/or the like. In some aspects, the acknowledgement may need only one cyclic shift (i.e., the cyclic shift index may be associated with a single cyclic shift).

In some aspects, the UE may determine the information that identifies the resource based at least in part on a frequency band associated with the random access procedure. For example, the UE may store or have access to information that associates frequency bands with information that identifies resources for transmitting acknowledgements. In this example, the UE may identify the frequency band associated with the random access procedure, and may determine the information that identifies the resource accordingly. As a particular example, the UE may be configured with information that associates each of a set of resource block indices with one of a set of frequency bands or portions of frequency bands (sometimes referred to as bandwidth parts). Here, the UE may identify the frequency band or portion of the frequency band, associated with the random access procedure, and may determine the resource block index, associated with the resource for transmitting the acknowledgement, accordingly.

Additionally, or alternatively, the UE may determine the information that identifies the resource based at least in part on a parameter received by the UE. For example, the UE may receive a PBCH, remaining minimum system information (RMSI), system information, and/or the like, that includes a parameter associated with identifying the resource. The parameter may include, for example, information that describes a set of resource blocks that is permitted to be used for transmitting the acknowledgement, information that describes a manner in which the UE is to identify the resource based at least in part on one or more messages in a sequence of messages associated with the random access procedure, as described below, and/or the like. In such a case, the UE may determine the information that identifies the resource based at least in part on the parameter. As a particular example, the UE may receive RMSI that includes one or more bits (e.g., four bits) that indicate an entry in a table (e.g., a table including 16 entries), where the indicated entry in the table includes the information that identifies the resource, for example, by identifying a set of resources, among which the resource is then identified using other methods as described herein.

Additionally, or alternatively, the UE may determine the information that identifies the resource based at least in part on a resource associated with at least one message in the sequence of messages associated with the random access procedure. For example, the UE may determine the information that identifies the resource based at least in part on a resource in which another message (e.g., Msg1, Msg2, Msg3, Msg13, Msg4, Msg24, the grants (if any) for these messages, and/or the like) was transmitted or received by the UE. Here, the UE may determine the information that identifies the resource based at least in part on timing information, frequency information, and/or code information associated with the resource in which the other message was transmitted or received. As a particular example, the UE may determine information that identifies a duration of the resource based at least in part on a duration of a resource associated with one or more other messages (e.g., when the duration of the resource is to match or be derived from the duration of the other resource).

As another particular example, the UE may determine the information that identifies the duration of the resource based at least in part on a duration of a preamble associated with another message (e.g., Msg1). In some cases, a relatively longer preamble may indicate that the resource for transmitting the acknowledgement is to be a relatively longer acknowledgement (i.e., that a relatively longer resource is to be used for transmitting the acknowledgement).

As another example, the UE may determine the information that identifies the resource based at least in part on resources associated with two or more messages associated with the random access procedure. As a particular example, the UE may determine the information that identifies the resource based at least in part on a time difference between an end of a particular message (e.g., Msg2) and a start of another particular message (e.g., Msg3).

Additionally, or alternatively, the UE may determine the information that identifies the resource based at least in part on a payload of at least one message in the sequence of messages associated with the random access procedure. For example, the UE may determine the information that identifies the resource based at least in part on information included in a payload of one or more messages (e.g., Msg1, Msg2, Msg3, Msg4, Msg13, Msg24, the grants (if any) for these messages, and/or the like) in the sequence of messages. As a particular example, the UE may determine the information that identifies the resource based at least in part on information in a payload of a message received by the UE (e.g., Msg2, Msg4, Msg24, the grants for these, and/or the like) and/or based on information in a payload of a message transmitted by the UE (e.g., Msg1, Msg3, Msg13, and/or the like). As another particular example, the UE may determine the information that identifies the duration of the resource based at least in part on a class of a preamble associated with another message (e.g., Msg1). As another example, the UE may determine the information that identifies the resource block index, the number of resource blocks, the sequence index, and/or the cyclic shift and/or OCC index based at least in part on information carried in the message (i.e., the frequency information and the code information may be signaled in a payload of Msg4 or a payload of Msg24).

As a particular example, the UE may determine the information that identifies the resource based at least in part on information carried in a payload of a particular message (e.g., Msg2) and information carried in a payload of another particular message (e.g., Msg4). In other words, the UE may determine the information that identifies the resource based at least in part on payloads of two or more messages in the sequence of messages, in some aspects.

As another example, the UE may determine the information that identifies the resource based at least in part on a request transmitted by the UE (e.g., in a payload of Msg3). For example, the UE may determine (e.g. based at least in part on a DL quality, based at least in part on a number of repeated power-ramped preambles) that a particular duration may be needed for the resource (e.g., in order to ensure that the base station will receive the acknowledgement), and may transmit a request (e.g., in Msg3) for a resource with the particular duration. In this example, the base station may send (e.g., in the Msg4 grant) information indicating whether the resource to be used for the acknowledgement has the particular duration.

Additionally, or alternatively, the UE may determine the information that identifies the resource based at least in part on a parameter associated with a monitoring period of a message associated with the random access procedure. For example, the UE may determine the information that identifies the resource based at least in part on a window length associated with monitoring for a particular message (e.g., Msg2) associated with the random access procedure, where the information that identifies the resource corresponds to or may be derived from the window length.

Additionally, or alternatively, the UE may determine the information that identifies the resource based at least in part on a grant associated with another message in the sequence of messages associated with the random access procedure. For example, the UE may determine the information that identifies the resource based at least in part on information carried in a grant associated with another message (e.g., a Msg2 grant).

Additionally, or alternatively, the UE may determine the information that identifies the resource based at least in part on a grant associated with the message. For example, the UE may determine the information that identifies the resource based at least in part on information carried in a grant associated with the message (e.g., a Msg4 grant). In some aspects, the UE may determine the information that identifies the resource based at least in part on downlink control information (DCI) associated with the message. As a particular example, the UE may determine the information that identifies the resource based at least in part on a set of DCI bits (e.g., three bits of DCI) and another set of bits (e.g., one bit that is implicitly derived based on a control channel index of PDCCH). Here, the set of DCI bits and the other set of bits may be used to identify, for example, one of a set of available PUCCH resources (e.g., one of a set of 16 available PUCCH resources), where the set of resources is identified using other methods as described herein.

Additionally, or alternatively, the UE may determine an item of information that identifies the resource based at least in part on another item of information that identifies the resource. For example, the UE may determine information that identifies the start location of the resource (e.g., a starting slot or a starting symbol) and may determine the duration of the resource based at least in part on the start location. For example, the UE may be configured to determine that the duration of the resource is from the start location to the end of a slot. As another example, the UE may be configured to identify whether the start location of the resource is in a RACH slot or a non-RACH slot, and may determine the duration of the resource based at least in part on the identification of the slot as a RACH slot or a non-RACH slot. In this context, a 'RACH slot' may be a slot in which a "RACH-like" uplink transmission may occur, for example RACH, beam-failure recovery request, and/or a RACH-like scheduling request (SR) transmission.

Additionally, or alternatively, the UE may determine the information that identifies the resource in a manner similar to that in which the UE identifies a resource for sending an acknowledgement associated with another type of transmission received by the UE, such as a PDSCH transmission received by the UE when in a connected mode.

Additionally, or alternatively, the UE may determine the information that identifies the resource based at least in part on a location of a PDSCH. For example, the UE may determine information that identifies the start location of the resource based at least in part on an end location of a PDSCH in a subframe and/or slot (e.g., when the start location of the resource is related to or may be derived from the end location of the PDSCH).

In some aspects, the UE may determine the information that identifies the resource using a combination of two or more techniques described above.

In some aspects, determining the information that identifies the resource using one or more of the above described techniques may simplify configuration at the UE (e.g., since the resource for transmitting the acknowledgement need not be explicitly signaled to the UE), while allowing the UE to identify a resource for transmitting an acknowledgement in a dynamically configurable PUCCH.

As shown by reference number 920, the UE may transmit the acknowledgement based at least in part on the information that identifies the resource. For example, the UE may identify the resource (e.g., a PUCCH resource) for transmitting the acknowledgement, as described above, and may transmit the acknowledgement, for reception by the base station, using the resource.

As indicated above, FIG. 9 is provided as an example. Other examples are possible and may differ from what was described with respect to FIG. 9.

The methods described above may be used for determining the resource used by a UE for transmission of acknowledgment of a RACH message that completes the RACH procedure. However, the scope of these methods is not limited to this transmission, and they may be also used to determine resources to be used by other messages exchanged between the UE and the base station during the RACH procedure. For example, the Msg4 resource may include frequency (e.g., resource block allocation), time (e.g., duration in number of OFDM symbols), and code (e.g., a number of spatial layers), and these may be identified based at least in part on the resources or the payloads of one or more of the preceding messages (e.g., Msg1, Msg2, Msg3, the grants for these, and/or the like).

Figure 10:
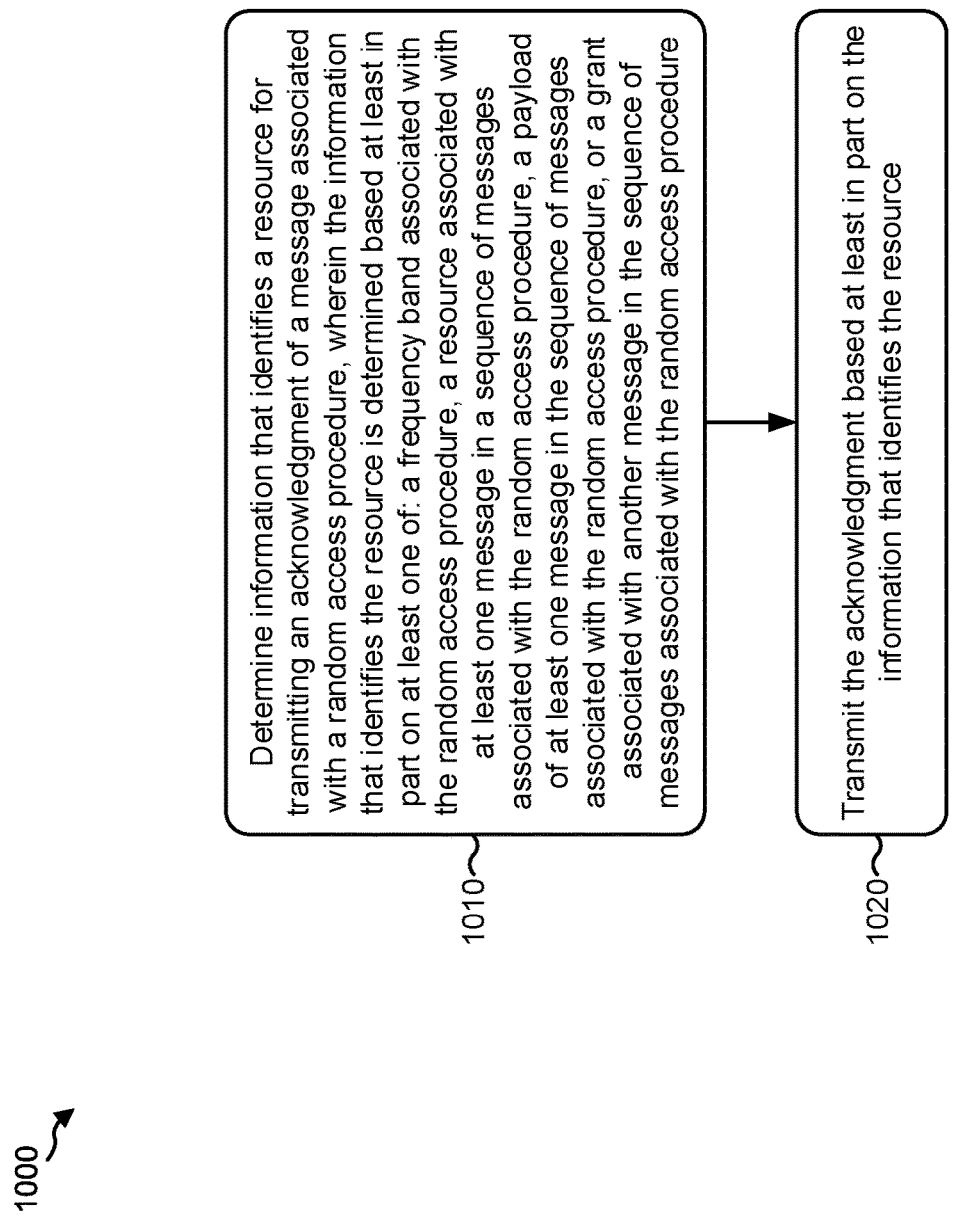
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. The UE may correspond to one or more of the UEs described above.

As shown in FIG. 10, in some aspects, process 1000 may include determining information that identifies a resource for transmitting an acknowledgment of a message associated with a random access procedure, wherein the information that identifies the resource is determined based at least in part on at least one of: a frequency band associated with the random access procedure, a resource associated with at least one message in a sequence of messages associated with the random access procedure, a payload of at least one message in the sequence of messages associated with the random access procedure, or a grant associated with another message in the sequence of messages associated with the random access procedure (block 1010). For example, the UE may determine information that identifies a resource for transmitting an acknowledgment of a message associated with a random access procedure, as described above.

As further shown in FIG. 10, in some aspects, process 1000 may include transmitting the acknowledgment based at least in part on the information that identifies the resource (block 1020). For example, the UE may transmit the acknowledgement based at least in part on the information that identifies the resource, as described above.

Process 1000 may include additional aspects, such as any single aspect or any combination of aspects described below and/or in connection with one or more other processes described elsewhere herein.

In some aspects, the information that identifies the resource is determined further based at least in part on a parameter received by the UE in a physical broadcast channel (PBCH).

In some aspects, the information that identifies the resource is determined further based at least in part on a parameter included remaining minimum system information (RMSI) received by the UE.

In some aspects, the information that identifies the resource is determined further based at least in part on a grant associated with the message.

In some aspects, the information that identifies the resource is determined further based at least in part on downlink control information (DCI) associated with the message. In some aspects, the acknowledgment is associated with a 1-bit on-off keying technique associated with the random access procedure.

In some aspects, the information that identifies the resource includes information that identifies a duration of the resource.

In some aspects, the information that identifies the duration of the resource is determined based at least in part on a duration of another message in the sequence of messages, wherein the duration of the other message is identified based at least in part on a resource associated with the other message.

In some aspects, the information that identifies the duration of the resource is determined based at least in part on a duration or a class of a preamble associated with another message in the sequence of messages, wherein the duration or the class of the preamble, associated with the other message, is determined based at least in part on a resource, associated with the other message, or a payload of the other message.

In some aspects, the information that identifies the duration of the resource is determined based at least in part on a start location of the acknowledgment.

In some aspects, the information that identifies the duration of the resource is determined based at least in part on a request included in another message in the sequence of messages, wherein the request is determined based at least in part on a payload of the other message.

In some aspects, the information that identifies the resource includes information that identifies a start location of the resource.

In some aspects, the information that identifies the start location is determined based at least in part on at least one of: downlink control information (DCI) associated with the message, or information included in a payload of the message.

In some aspects, the information that identifies the start location is determined based at least in part on a physical downlink shared channel (PDSCH).

In some aspects, the information that identifies the resource includes information that identifies a resource block index associated with the resource.

In some aspects, the resource block index is identified based at least in part on a portion of a frequency bandwidth in which the acknowledgement is to be transmitted, wherein the portion of the frequency bandwidth in which the acknowledgement is to be transmitted is identified based at least in part on another message in the sequence of messages.

In some aspects, the information that identifies the resource includes information that identifies a number of resource blocks included in the resource.

In some aspects, the number of resource blocks is a fixed number of resource blocks.

In some aspects, the information that identifies the resource includes information that identifies a sequence index associated with the resource.

In some aspects, the information that identifies the resource includes information that identifies a cyclic shift index associated with the resource.

In some aspects, the cyclic shift index is associated with a single cyclic shift.

In some aspects, the random access procedure is a four-step random access procedure.

In some aspects, the random access procedure is a two-step random access procedure.

In some aspects, the acknowledgment is transmitted in a physical uplink control channel (PUCCH).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method performed by a user equipment (UE), the method comprising:
   identifying, from a plurality of resource sets, a resource set from which a resource for transmitting an acknowledgment of a message associated with a random access procedure is identified;
   determining information that identifies the resource from the resource set, wherein the information that identifies the resource is determined based at least in part on three bits of downlink control information (DCI) associated with the message and one bit derived from a control channel index of a physical downlink channel (PDCCH): and
   transmitting, by the UE, the acknowledgment based at least in part on the information that identifies the resource.

2. The method of claim 1, wherein the information that identifies the resource is determined further based at least in part on a parameter received by the UE in a physical broadcast channel (PBCH).

3. The method of claim 1, wherein the resource set is identified based at least in part on a parameter included in remaining minimum system information (RMSI) received by the UE.

4. The method of claim 3, wherein the plurality of resource sets comprises 16 possible resource sets that are available for transmission of the acknowledgement.

5. The method of claim 1, wherein the information that identifies the resource is determined further based at least in part on a grant associated with the message.

6. The method of claim 1, wherein the acknowledgment is associated with a 1-bit on-off keying technique associated with the random access procedure.

7. The method of claim 1, wherein the information that identifies the resource includes information that identifies a duration of the resource.

8. The method of claim 7, wherein the information that identifies the duration of the resource is determined based at least in part on a duration of another message in a sequence of messages associated with the random access procedure, wherein the duration of the other message is identified based at least in part on a resource associated with the other message.

9. The method of claim 7, wherein the information that identifies the duration of the resource is determined based at least in part on a duration or a class of a preamble associated with another message in a sequence of messages associated with the random access procedure, wherein the duration or the class of the preamble is determined based at least in part on a resource, associated with the other message, or a payload of the other message.

10. The method of claim 7, wherein the information that identifies the duration of the resource is determined based at least in part on a start location of the acknowledgment.

11. The method of claim 7, wherein the information that identifies the duration of the resource is determined based at least in part on a request included in another message in a sequence of messages associated with the random access procedure, wherein the request is determined based at least in part on a payload of the other message.

12. The method of claim 1, wherein the information that identifies the resource includes information that identifies a start location of the resource.

13. The method of claim 12, wherein the information that identifies the start location is determined based at least in part on at least one of:
the DCI associated with the message, or information included in a payload of the message.

14. The method of claim 12, wherein the information that identifies the start location is determined based at least in part on a physical downlink shared channel (PDSCH).

15. The method of claim 1, wherein the information that identifies the resource includes information that identifies a resource block index associated with the resource.

16. The method of claim 1, wherein the information that identifies the resource includes information that identifies a number of resource blocks included in the resource.

17. The method of claim 1, wherein the information that identifies the resource includes information that identifies a sequence index associated with the resource.

18. The method of claim 1, wherein the information that identifies the resource includes information that identifies a cyclic shift index associated with the resource.

19. The method of claim 1, wherein the information that identifies the resource identifies the resource from the resource set of 16 available PUCCH resources.

20. A user equipment (UE) for wireless communication, comprising:
   memory; and
   one or more processors coupled to the memory, and
   instructions stored in the memory and operable, when executed by the one or more processors to cause the UE to:
      identify, from a plurality of resource sets, a resource set from which a resource for transmitting an acknowledgment of a message associated with a random access procedure is identified;
      determine information that identifies the resource from the resource set, wherein the information that identifies the resource is determined based at least in part on three bits of downlink control information (DCI) associated with the message and one bit derived from a control channel index of a physical downlink channel (PDCCH): and
      transmit the acknowledgment based at least in part on the information that identifies the resource.

21. The UE of claim 20, wherein the resource set is identified based at least in part on a parameter included in remaining minimum system information (RMSI) received by the UE.

22. The UE of claim 21, wherein the plurality of resource sets comprises 16 possible resource sets that are available for transmission of the acknowledgement.

23. The UE of claim 20, wherein the information that identifies the resource is determined further based at least in part on a grant associated with the message.

24. The UE of claim 20, the information that identifies the resource identifies the resource from the resource set of 16 available PUCCH resources.

25. An apparatus for wireless communication, comprising:
   means for identifying, from a plurality of resource sets, a resource set from which a resource for transmitting an acknowledgment of a message associated with a random access procedure is identified;
   means for determining information that identifies the resource from the resource set, wherein the information that identifies the resource is determined based at least in part on three bits of downlink control information (DCI) associated with the message and one bit derived from a control channel index of a physical downlink channel (PDCCH); and
   means for transmitting the acknowledgment based at least in part on the information that identifies the resource.

26. The apparatus of claim 25, wherein the the resource set is identified based at least in part on a parameter included in remaining minimum system information (RMSI) received by the apparatus.

27. The apparatus of claim 26, wherein the plurality of resource sets comprises 16 possible resource sets that are available for transmission of the acknowledgement.

28. The apparatus of claim 25, wherein the information that identifies the resource is determined further based at least in part on a grant associated with the message.

29. The apparatus of claim 25, wherein the information that identifies the resource identifies the resource from the resource set of 16 available PUCCH resources.

30. A non-transitory computer-readable medium storing one or more instructions for wireless communication that, when executed by one or more processors of a user equipment (UE), cause the UE to:
   identify, from a plurality of resource sets, a resource set from which a resource for transmitting an acknowledgment of a message associated with a random access procedure is identified;
   determine information that identifies the resource from the resource set, wherein the information that identifies the resource is determined based at least in part on three bits of downlink control information (DCI) associated with the message and one bit derived from a control channel index of a physical downlink channel (PDCCH): and
   transmit the acknowledgment based at least in part on the information that identifies the resource.

31. The non-transitory computer-readable medium of claim 30, wherein the resource set is identified based at least in part on a parameter included in remaining minimum system information (RMSI) received by the UE.

32. The non-transitory computer-readable medium of claim 31, wherein the plurality of resource sets comprises 16 possible resource sets that are available for transmission of the acknowledgement.

33. The non-transitory computer-readable medium of claim 30, wherein the information that identifies the resource is determined further based at least in part on a grant associated with the message.

34. The non-transitory computer-readable medium of claim 30, wherein the information that identifies the resource identifies the resource from the resource set of 16 available PUCCH resources.

* * * * *